(12) United States Patent
Pap et al.

(10) Patent No.: US 12,104,495 B2
(45) Date of Patent: Oct. 1, 2024

(54) DRIVE ASSEMBLY FOR A MECHANICAL REDUCER FOR AN AIRCRAFT TURBOMACHINE

(71) Applicant: SAFRAN TRANSMISSION SYSTEMS, Colombes (FR)

(72) Inventors: Bálint Pap, Moissy-Cramayel (FR); Clément Jarroux, Moissy-Cramayel (FR); Guillaume Pierre Mouly, Moissy-Cramayel (FR); Pierre-Damien Tune, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/465,336

(22) Filed: Sep. 12, 2023

(65) Prior Publication Data

US 2024/0084712 A1    Mar. 14, 2024

(30) Foreign Application Priority Data

Sep. 12, 2022   (FR) ...................................... 2209132

(51) Int. Cl.
    *F01D 15/12*    (2006.01)
(52) U.S. Cl.
    CPC .......... *F01D 15/12* (2013.01); *F05D 2240/50* (2013.01); *F05D 2260/40311* (2013.01); *F05D 2260/98* (2013.01)
(58) Field of Classification Search
    CPC . F01D 15/12; F16H 1/28; F16H 57/08; F16H 57/082; F16H 57/0479; F16H 57/0482; F16C 11/02; F05D 2240/50; F05D 2260/40311; F05D 2260/98

USPC ....................................................... 415/122.1
See application file for complete search history.

(56) References Cited

U.S. PATENT DOCUMENTS

| | | | | |
|---|---|---|---|---|
| 4,954,123 | A * | 9/1990 | Kurywczak | F16H 1/46 475/179 |
| 5,376,057 | A * | 12/1994 | Cooper | F16H 1/22 475/248 |
| 7,291,088 | B2 * | 11/2007 | Arndt | F16H 1/22 475/331 |

(Continued)

FOREIGN PATENT DOCUMENTS

| DE | 10 2019 212 444 A1 | 2/2021 |
|---|---|---|
| EP | 3 109 452 A1 | 12/2016 |

(Continued)

OTHER PUBLICATIONS

France Search Report mailed Mar. 28, 2023, issued in Application No. FR 2209132, filed Sep. 12, 2022, 2 pages.

*Primary Examiner* — Woody A Lee, Jr.
*Assistant Examiner* — Justin A Pruitt
(74) *Attorney, Agent, or Firm* — CHRISTENSEN O'CONNOR JOHNSON KINDNESS PLLC

(57) ABSTRACT

A drive assembly for a mechanical reducer for a turbomachine, in particular for an aircraft, includes planet gears, a planet carrier having at least one transverse wall, plain bearings for guiding the planet gears in rotation, and an oil supply circuit for the plain bearings. The planet carrier has collars for attaching the planet gears to the at least one transverse wall, and each of the planet gears includes at least one external cylindrical surface for forming an oil film with an internal cylindrical surface portion of each of the collars for forming said oil film.

17 Claims, 7 Drawing Sheets

(56) References Cited

U.S. PATENT DOCUMENTS

| | | | | |
|---|---|---|---|---|
| 8,118,702 | B2* | 2/2012 | Hansson | B25F 5/001 |
| | | | | 475/338 |
| 8,529,397 | B2* | 9/2013 | Demtroder | F16H 1/28 |
| | | | | 475/331 |
| 10,443,708 | B2* | 10/2019 | Sheridan | F16H 57/0471 |
| 10,724,445 | B2* | 7/2020 | Sheridan | F02K 3/06 |
| 2016/0215871 | A1 | 7/2016 | Brault et al. | |

FOREIGN PATENT DOCUMENTS

| | | |
|---|---|---|
| FR | 3 010 449 A1 | 3/2015 |
| FR | 3 088 977 A1 | 5/2020 |
| FR | 3 088 978 A1 | 5/2020 |
| FR | 3 095 252 A1 | 10/2020 |
| FR | 3 111 400 A1 | 12/2021 |
| WO | 2021/063437 A1 | 4/2021 |

* cited by examiner

DRIVE ASSEMBLY FOR A MECHANICAL REDUCER FOR AN AIRCRAFT TURBOMACHINE

CROSS-REFERENCE TO RELATED APPLICATION

This application claims priority to FR 2209132, filed Sep. 12, 2022, the disclosure of which is hereby expressly incorporated by reference herein in its entirety.

TECHNICAL FIELD

The present disclosure relates to the field of mechanical reducers for turbomachines, in particular for an aircraft, and more particularly to a drive assembly for a turbomachine mechanical reducer.

BACKGROUND

The prior art comprises in particular the documents FR-B1-3 088 977, FR-B1-3 088 978, FR-B1-3 095 252, FR-B1-3 111 400, EP-A1-3 109 452, FR-A1-3 010 449, DE-A1-10 2019 212444 and WO-A1-2021/063437.

The role of a mechanical reducer is to modify the speed and torque ratio between the input axle and the output axle of a mechanism.

The new generations of double-flow turbomachines, in particular those with a high bypass ratio, comprise a mechanical reducer to drive the shaft of a fan. The usual purpose of the reducer is to convert the rotational speed referred to as high speed of the shaft of a power turbine into a slower rotational speed for the shaft driving the fan.

Such a reducer comprises a central pinion, referred to as sun gear, a ring gear and pinions referred to as planet gears, which are engaged between the sun gear and the ring gear. The planet gears are held by a frame referred to as planet carrier. The sun gear, the ring gear and the planet carrier are planetary because their axes of revolution coincide with the longitudinal axis X of the turbomachine. The planet gears each have a different axis of revolution Y and are equally distributed on the same operating diameter around the axis of the planetaries. These axes Y are parallel to the longitudinal axis X.

There are several reducer architectures. In the prior art of the double-flow turbomachines, the reducers are of the planetary or epicyclic type. In other similar applications, there are architectures referred to as differential or "compound".

In a planetary reducer, the planet carrier is stationary, and the ring gear is the output shaft of the device which rotates in the opposite orientation of the sun gear.

In an epicyclic reducer, the ring gear is stationary, and the planet carrier is the output shaft of the device which rotates in the same orientation as the sun gear.

On a compound reducer, no element is attached in rotation. The ring gear rotates in the opposite orientation of the sun gear and of the planet carrier.

The reducers may comprise one or more meshing stages. This gearing is ensured in different ways such as by contact, friction, or magnetic field. There are several types of meshing by contact such as straight or herringbone toothings.

A reducer needs to be lubricated and the supply of lubricating oil to the rotating components of a reducer can be problematic. The oil is generally fed to the reducer by a lubricating oil dispenser.

The planet gears are guided in rotation by lubricated bearings. The bearings can be made up of rolling elements (ball, roller, tapered roller bearings, etc.) or can be hydrodynamic bearings. In the latter case, each planet gear is mounted so that it can rotate on and around a plain bearing carried by the planet carrier. This plain bearing is supplied with oil and is configured to form a film of oil between its external periphery and the internal periphery of the planet gear it is guiding. For this purpose, in the current technique, each planet gear comprises an internal cylindrical surface which extends around an external cylindrical surface of the plain bearing, and which delimits with the latter an annular space for the formation of the oil film. This space is supplied with oil through oil conveying orifices which are formed in the plain bearing and extend from the external cylindrical surface to an internal cavity of the plain bearing which is fed with oil by the aforementioned dispenser.

The present application concerns a reducer whose planet gears are guided by plain bearings or hydrodynamic bearings.

A mechanical reducer has a mass and an overall dimension, which are linked in particular to the weight and the overall dimension of the planet carrier. In the current technology, the planet gears are guided by internal hydrodynamic bearings which are designed to withstand the mechanical and vibratory stresses encountered during operation. The longer the bearings and the larger their diameter, the greater their ability to support heavy loads. The larger these dimensions, the larger the dimensions of the planet gears. The dimensions and the geometry of the planet gears are therefore not necessarily controlled by their toothings but rather by the dimensions and the geometry of their bearings. Similarly, the axial overall dimensions of the bearings have an impact on the axial overall dimensions of the reducer, and the radial overall dimensions of the bearings have an impact on the radial overall dimensions of the reducer.

The present disclosure proposes a simple, effective, and economical improvement for reducing the overall dimension and the mass of the plain bearings guiding the planet gears and, in the process, the overall dimension and the mass of the mechanical reducer.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The disclosure relates to a drive assembly for a mechanical reducer for a turbomachine, in particular for an aircraft, this assembly comprising:
  planet gears distributed around a first axis and having second axes of rotation parallel to each other and to the first axis, each of the planet gears comprising at least one external meshing toothing,
  a planet carrier comprising at least one transverse wall perpendicular to the first axis,
  plain bearings for guiding the planet gears in rotation about their second axes, these plain bearings being carried by the planet carrier, and
  an oil supply circuit for the plain bearings,
  characterised in that the planet carrier comprises collars for attaching the planet gears to the at least one transverse wall, each of these collars extending around a planet gear and its second axis and comprising at least one internal cylindrical surface portion, in that each of the planet gears comprises at least one external cylindrical oil film-forming surface with the at least one internal cylindrical surface portion, and in that the oil supply circuit opens onto the at least one internal cylindrical surface portion of each of the collars for the formation of the oil film.

The disclosure thus proposes to centre and guide the planet gears from the outside rather than from the inside. This means that the plain bearings are not mounted inside the planet gears, but outside the planet gears. This is made possible by the fact that the planet carrier comprises collars for attaching the planet gears, these collars defining one or more spaces around the planet gears for the formation of an oil film. This means that the interior of the planet gears can be free. The dimensions and geometry of the planet gears are therefore not necessarily constrained by those of the bearings. This reduces the overall dimension and the weight of the reducer.

The proposed solution is compatible with a single-stage or multi-stage reducer. The proposed solution is compatible with an epicyclic, planetary or differential reducer. The proposed solution is compatible with straight, helical or herringbone toothings. Finally, the proposed solution is compatible with all types of planet carrier, whether monobloc or cage and cage carrier type.

The assembly according to the disclosure may comprise one or more of the following characteristics, taken alone from each other, or in combination with each other:

- the internal cylindrical surface portion of each of the collars extends around the second axis in the extension of an internal cylindrical surface portion of the at least one transverse wall;
- each of the planet gears is attached by one, two or three attachment collars;
- each of the planet gears is attached by two lateral attachment collars, which are located in two planes perpendicular to the first axis and passing through the longitudinal ends of the planet gears;
- the planet carrier comprises two transverse lateral walls, which are located respectively in the two lateral planes perpendicular to the first axis and to which the two attachment collars are attached respectively;
- each of the planet gears comprises two external cylindrical oil film-forming surfaces at its two longitudinal ends;
- each of the planet gears is attached by a median attachment collar, which is located in a median plane perpendicular to the first axis and passing through the middles of the planet gears;
- the planet carrier comprises a median transverse wall which is situated in the first plane, and which carries the median attachment collar;
- each of the planet gears comprises two external meshing toothings which are separated from each other by an external cylindrical oil film-forming surface;
- the external cylindrical surface is located at the bottom of an annular groove which extends around the second axis, and which separates the two toothings, this external cylindrical surface being surrounded by a collar which is at least partly housed in this groove;
- the clamping collars each have an angular extent about one of the second axes greater than or equal to 180°;
- at each of its circumferential ends, each collar comprises an attachment tab or flange which is intended to be applied against a corresponding attachment tab or flange of a wall of the planet carrier and which comprises orifices for the passage of screws or bolts;
- the planet carrier comprises a cage and a cage carrier connected to the cage by flexible connections, the attachment collars and the at least one transverse wall forming part of the cage;
- the at least one internal cylindrical surface portion of each of the attachment collars comprises at least one oil circulation groove;
- the groove is generally T-shaped and comprises two branches, referred to as a first branch which extends in the circumferential direction over the at least one internal cylindrical surface portion and around the second axis, and a second transverse branch which extends in the axial direction at one of the ends of the first branch and along the axis;
- the end of the first branch opposite the second branch is in fluidic communication with a groove in the and/or an orifice in the at least one transverse wall.

This disclosure also relates to a mechanical reducer for a turbomachine, in particular for an aircraft, comprising an assembly as described above, the reducer comprising a sun gear centered on the first axis and meshed with the planet gears, and a ring gear centered on the first axis and meshed with the planet gears.

The disclosure also relates to a turbomachine, in particular for an aircraft, comprising at least one assembly or at least one mechanical reducer as described above.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Figure 1:
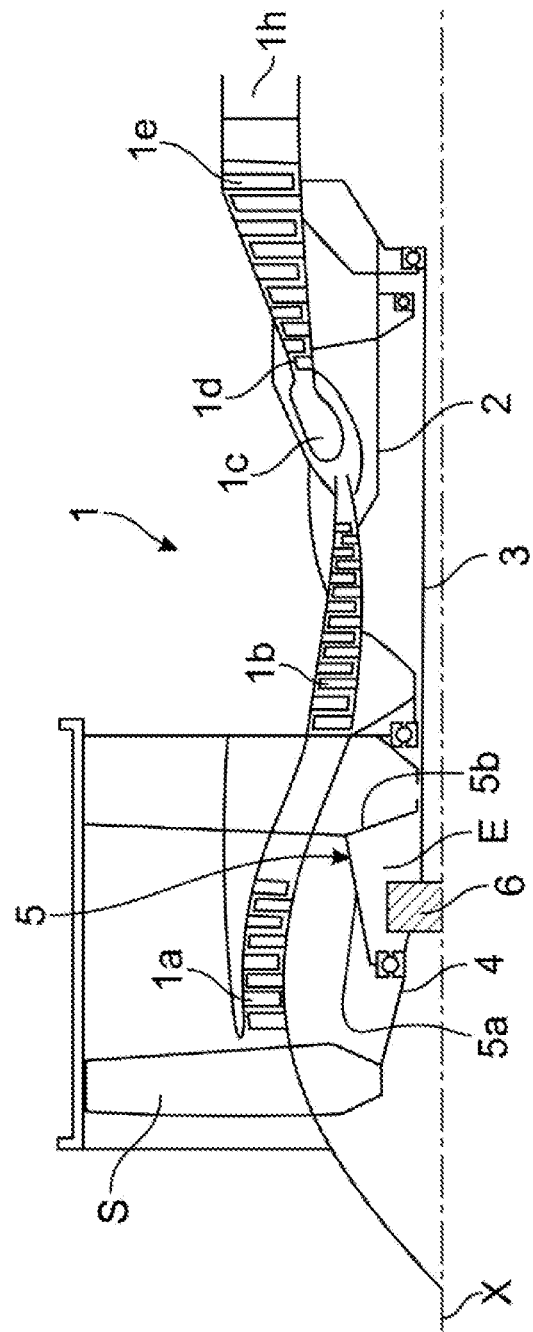
FIG. 1 is a partial schematic view in axial cross-section of a turbomachine using the disclosure.

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The fan S is driven by a fan shaft 4 which is driven to the LP shaft 3 by means of a reducer 6. This reducer 6 is generally of the planetary or epicyclic type.

The reducer 6 is positioned in the upstream portion of the turbomachine. In this application, the expressions upstream and downstream refer to the general flow of the gases in the turbomachine, along its axis of elongation or rotation of its rotors. A stationary structure comprising schematically, here, an upstream portion 5a and a downstream portion 5b which makes up the engine casing or stator 5 is arranged so as to form an enclosure E surrounding the reducer 6. This enclosure E is here closed upstream by joints at the level of a bearing allowing the passage of the fan shaft 4, and downstream by joints at the level of the passage of the LP shaft 3.

Figure 2:
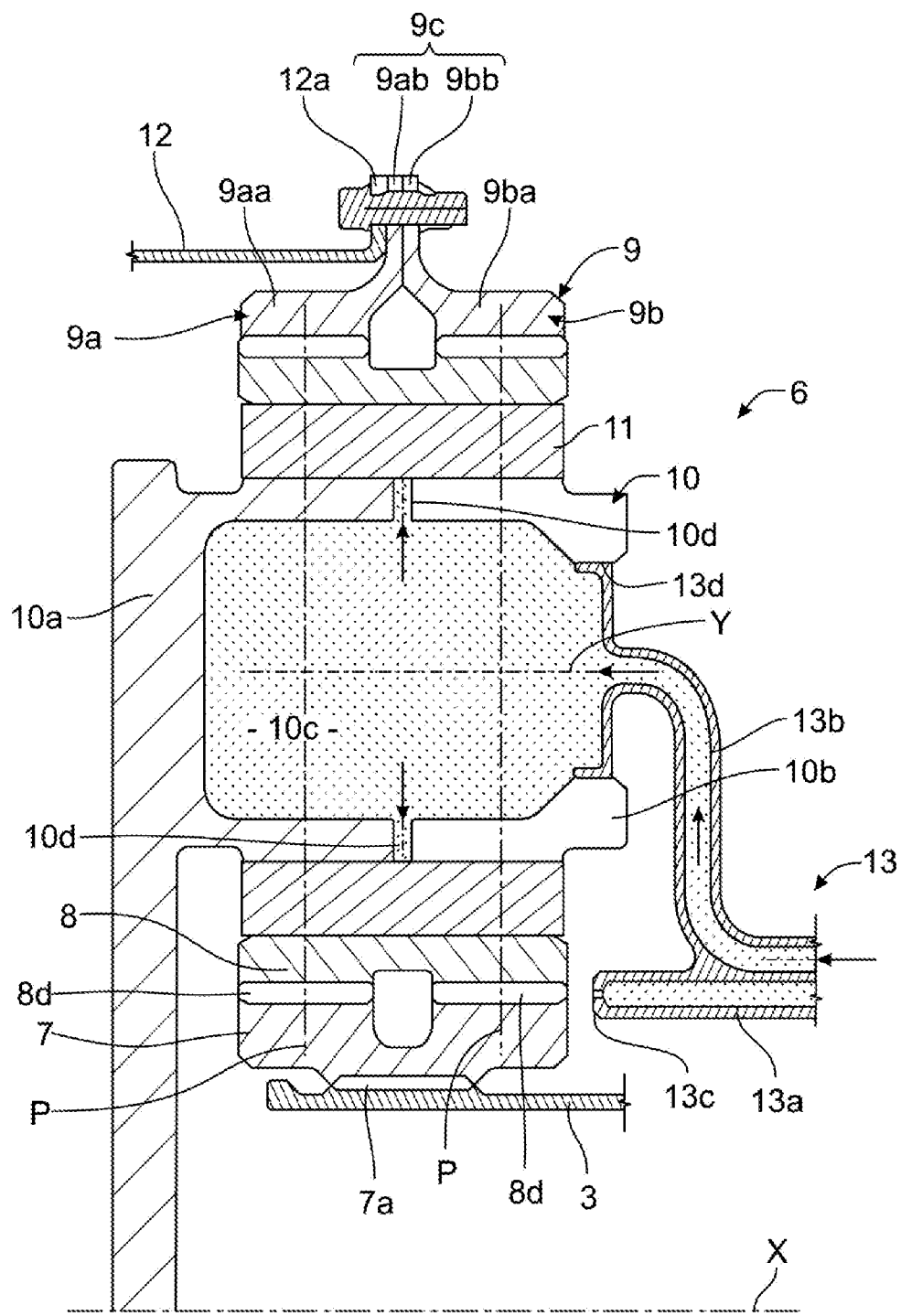
FIG. 2 is a partial schematic view of a mechanical reducer in axial cross-section.

FIG. 2 shows an epicyclic reducer 6. In the inlet, the reducer 6 is connected to the LP shaft 3, for example by means of internal splines 7a. Thus, the LP shaft 3 drives a planetary pinion referred to as the sun gear 7. Classically, the sun gear 7, whose axis of rotation is coincident with that of the turbomachine X, drives a series of pinions referred to as planet gears 8, which are equally distributed on the same diameter around the axis of rotation X. This diameter is equal to twice the operating centre distance between the sun gear 7 and the planet gears 8. The number of planet gears 8 is generally defined between three and seven for this type of application.

The assembly of the planet gears 8 is maintained by a frame referred to as planet carrier 10. Each planet gear 8 rotates around its own axis Y and meshes with the ring gear 9.

In the output we have:

In this epicyclic configuration, the assembly of the planet gears 8 drives the planet carrier 10 in rotation about the axis X of the turbomachine. The ring gear is attached to the engine casing or stator 5 via a ring gear carrier 12 and the planet carrier 10 is attached to the fan shaft 4.

in another planetary configuration, the assembly of the planet gears 8 is maintained by a planet carrier 10 which is attached to the engine casing or stator 5. Each planet gear drives the ring gear which is fitted to the fan shaft 4 via a ring gear carrier 12.

Each planet gear 8 is mounted free in rotation by means of a bearing 11, for example of the rolling or hydrodynamic bearing type. Each bearing 11 is provided on one of the tubular supports 10b of the planet carrier 10 and all the supports are positioned relative to each other using a cage 10a of the planet carrier 10. The number of tubular supports 10b and bearings 11 is equal to the number of planet gears. For reasons of operation, assembly, manufacture, inspection, repair or replacement, the supports 10b and the cage 10a can be separated into several parts.

For the same reasons as above, the toothing of a reducer can be split into several propellers, each with a median plane P. In our example, we detail the operation of a multi-propeller reducer with one ring gear split into two half-ring gears:

an upstream half-ring gear 9a consisting of a rim 9aa and an attachment half-flange 9ab. On the rim 9aa there is the upstream propeller of the toothing of the reducer. This upstream propeller meshes with that of the planet gear 8, which meshes with that of the sun gear 7.

a downstream half-ring gear 9b consisting of a rim 9ba and an attachment half-flange 9bb. On the rim 9ba is the downstream propeller of the toothing of the reducer. This downstream propeller meshes with that of the planet gear 8 which meshes with that of the sun gear 7.

If the propeller widths vary between the sun gear 7, the planet gears 8 and the ring gear 9 because of the toothing overlaps, they are all centered on a median plane P for the upstream propellers and on another median plane P for the downstream propellers. In the case of a two-row roller bearing, each row of rolling elements is also preferably, but not necessarily, centered on two median planes.

The attachment half-flange 9ab of the upstream ring gear 9a and the attachment half-flange 9bb of the downstream ring gear 9b form the attachment flange 9c of the ring gear. The ring gear 9 is attached to a ring gear carrier by assembling the attachment flange 9c of the ring gear and the attachment flange 12a of the ring gear carrier by means of a bolted mounting, for example.

The arrows in FIG. 2 describe the oil conveyed in the reducer 6. The oil enters the reducer 6 from the stator portion 5 into a dispenser 13 by different means which will not be specified in this view because they are specific to one or more types of architecture. The dispenser 13 comprises injectors 13a and arms 13b. The function of the injectors 13a is to lubricate the toothings and the function of the arms 13b is to lubricate the bearings. The oil is fed towards the injector 13a and exits through the end 13c to lubricate the toothings. The oil is also supplied towards the arm 13b and circulates via the supply mouth 13d of the bearing 11. The oil then circulates through the support 10b into one or more cavities 10c and then exit through pipes 10d to lubricate the bearings of the planet gears.

Figure 3:
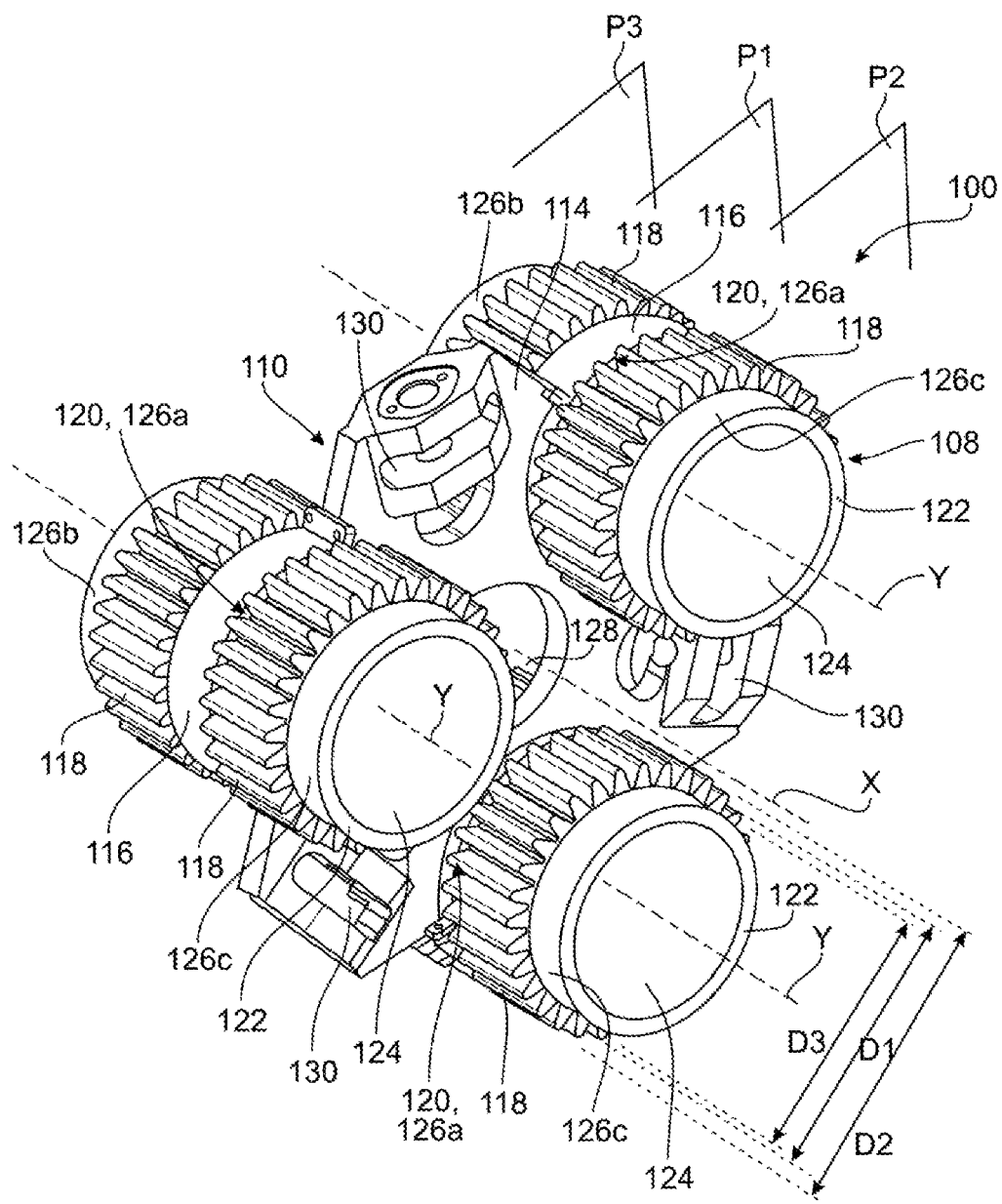
FIG. 3 is a partial schematic perspective view of a drive assembly according to a first embodiment of the disclosure.

FIG. 3 shows a first embodiment of a drive assembly 100 according to the disclosure for a mechanical reducer of a turbomachine, in particular for an aircraft.

The foregoing description of the turbomachine 1 of FIG. 1 and the reducer 6 of FIG. 2 applies to the present disclosure insofar as it does not contradict what follows.

The following description therefore focuses on the assembly 100, but it is clear that this assembly 100 is part of a reducer 6 of the type shown in FIG. 2, which therefore comprises a sun gear 7, a ring gear 9, etc.

The assembly 100 shown in FIG. 3 essentially comprises:
planet gears 108 distributed around the first axis X and having second axes of rotation Y parallel to each other and to the first axis X, and
a planet carrier 110 which comprises at least one transverse wall 114 which is perpendicular to the first axis X, and collars 116 for attaching the planet gears 108 to this wall 114.

In the example shown, the planet carrier 110 comprises a single transverse wall 114 which is a median wall extending in a median plane P1 perpendicular to the axis X and Y and passing through the middle of the planet gears 108.

Furthermore, in the example shown, each planet gear 108 is attached to the wall 114 by a single collar 116 which is located in the median plane P1. The number of collars 116 is therefore equal to the number of planet gears 108, which is three in the example, although this figure is not limitative.

Each planet gear 108 comprises at least one external meshing toothing 118, in particular with the sun gear and the ring gear of the reducer, which are not shown.

In the example shown, each planet gear 108 comprises two external meshing toothings 118 which are adjacent and separated from each other by an annular groove 120. The toothings 118 and the groove 120 extend around the axis Y of the planet gear 108. The toothings 118 are straight here, although this aspect is not limiting either.

The toothings 118 and the groove 120 are formed on a cylindrical body 122 of the planet gear 108, which is generally tubular in shape and therefore hollow. The planet gear 108 thus comprises an internal cavity 124 which can pass axially through the entire length or axial dimension of the body 122.

Each planet gear 108 comprises at least one external cylindrical surface 126a, 126b, 126c, of which there are three in the example shown.

Figure 4:
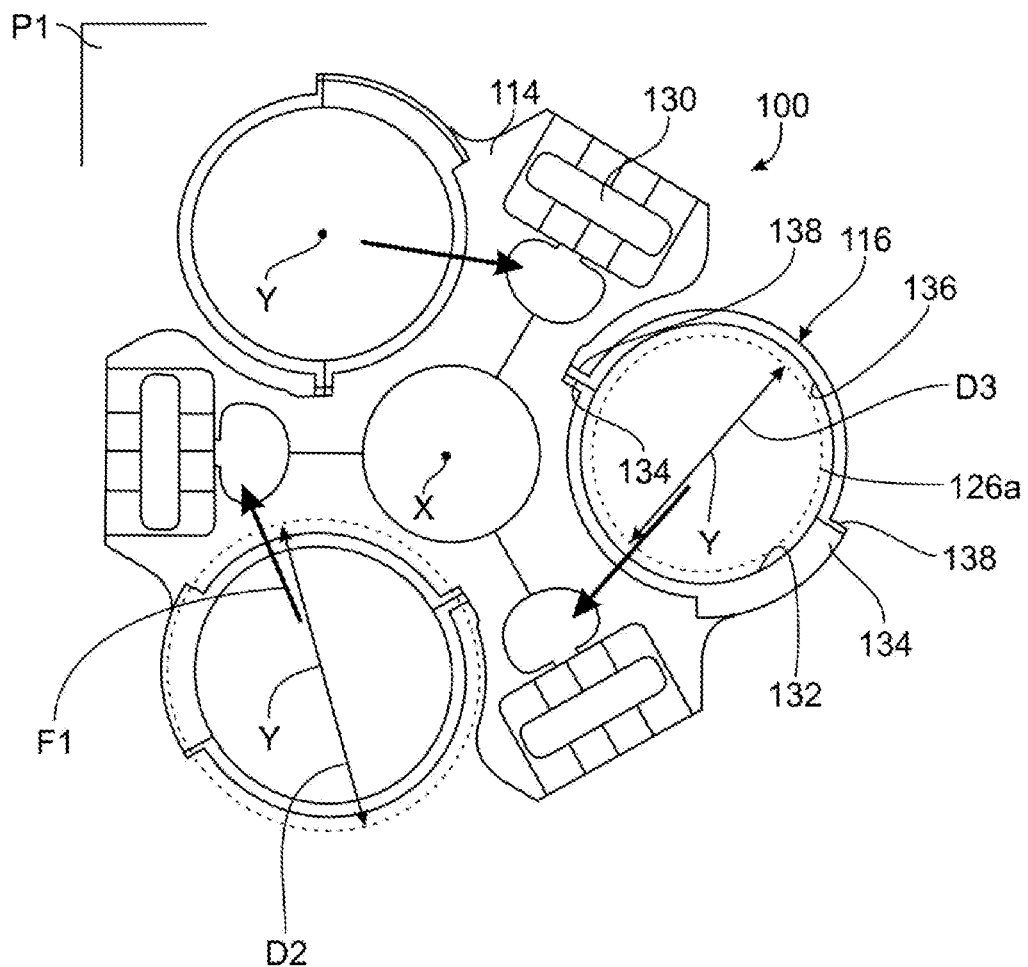
FIG. 4 is a schematic front view of the assembly shown in FIG. 3.

Each planet gear 108 comprises a median external cylindrical surface 126a which is located here in the middle of the planet gear 108, at the bottom of the groove 120 and is visible in FIG. 4. This surface 126a is passed through by the plane P1.

Each planet gear 108 may comprise two lateral external cylindrical surfaces 126b, 126c which are located here at the longitudinal ends of the planet gear 108. These surfaces 126b, 126c are passed through respectively by two planes P2, P3 perpendicular to the axes X, Y and arranged respectively on either side of the wall 114.

Each of the toothings 118 is located between the surface 126a and one of the surfaces 126b, 126c.

In the example shown, the toothings 118 have an external diameter D1 and an internal diameter D2. The surfaces 126a-126c may have the same diameter D3, which is for example less than D1 and less than or equal to D2.

The transverse wall 114 may comprise a central orifice 128 for lightening or passage of a coupling shaft of the sun gear of the reducer.

The planet carrier 110 may be a monobloc or a cage and cage carrier type. In the case of a monobloc planet carrier 110, the planet carrier can form a torque output and be connected, for example, to a rotating shaft of the turbomachine, or it can form a stator and be connected to a stationary casing of the turbomachine.

In the case of a planet carrier 110 with a cage and cage carrier, the wall 114 and the attachment collars 116 may form a cage or form part of a cage, which is intended to be connected by flexible connections to a cage carrier. This cage carrier may itself form a torque output and be connected to a rotating shaft of the turbomachine, for example, or it may form a stator and be connected to a stationary casing of the turbomachine.

In the example shown of a planet carrier 110 of the cage and cage carrier type, only the cage is shown and is formed by the wall and the attachment collars 116. At its external periphery, the wall 114 comprises first elements, such as housings 130, configured to cooperate by engagement with second elements, such as fingers of the cage carrier (not shown). The flexible connections of the fingers in the housings can be ball-and-socket joints, for example.

In the example shown, the wall 114 has a generally triangular shape with truncated summits. The housings 130 are located at the level of these truncated summits and the attachment collars 114 are fitted to the sides of the triangle.

As illustrated in the drawings, each of these sides comprises a semi-circular housing which comprises an internal cylindrical surface portion 132. This surface portion 132 has an angular extent around the axis Y of the order of 180°+/−10%.

At each of the circumferential ends of this surface portion 132, the wall comprises an attachment tab or flange 134 which comprises orifices 135 through which screws or bolts can pass.

The flanges 134 located at the ends of the same surface portion 132 preferably extend in the same plane. They are therefore coplanar.

Each of the attachment collars 116 extends around an axis Y and has an angular extent around this axis which is, for example, of the order of 180°+/−10%. This angular extent is determined, for example, to allow and facilitate the mounting of the planet gears 108.

Figure 5:
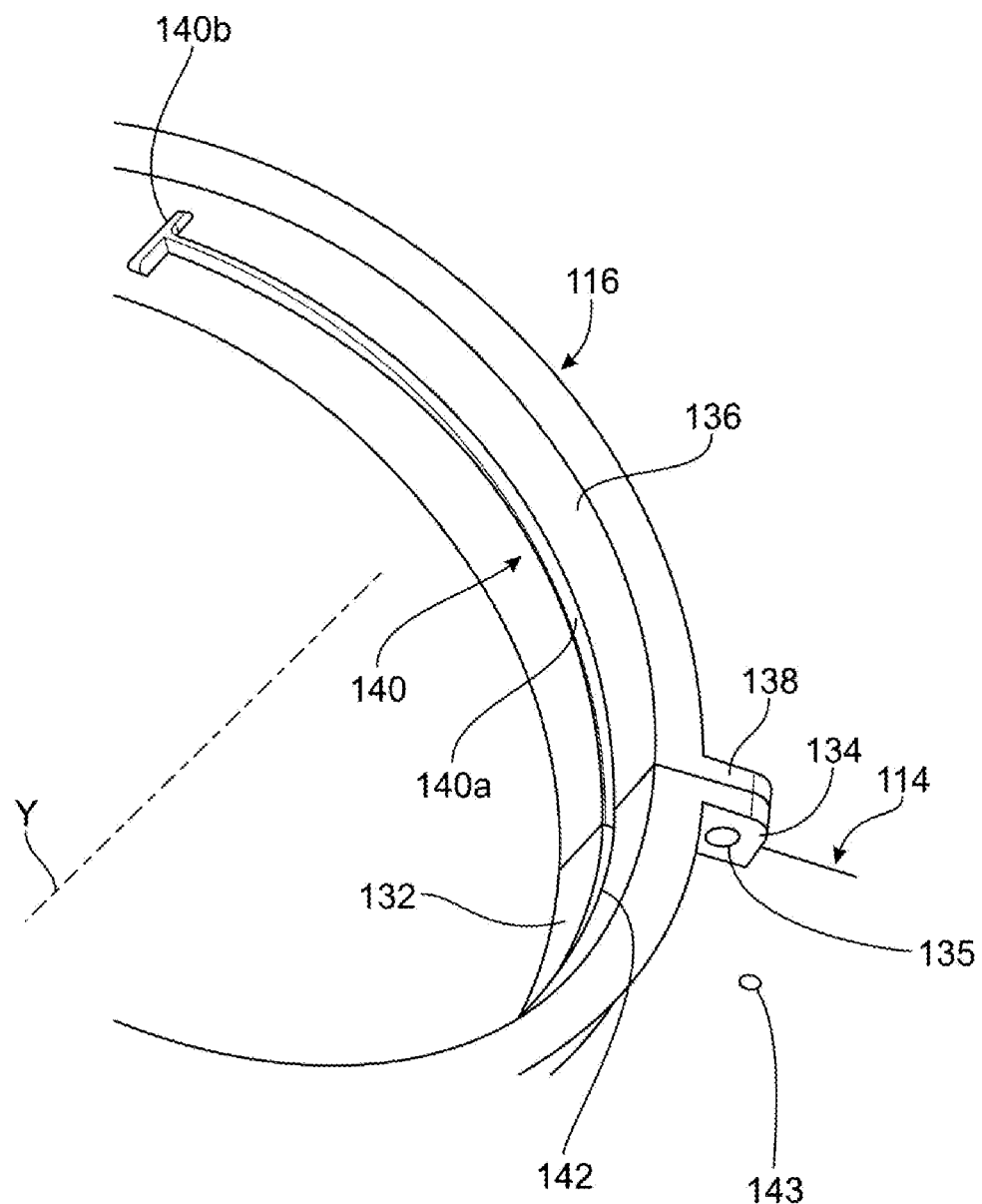
FIG. 5 is another schematic partial perspective view of an attachment collar and a transverse wall of a planet carrier of the assembly of FIG. 3.

The collars 116 are passed through by the plane P1 and extend respectively around the surfaces 126a of the planet gears 108. The collars 116 each comprise an internal cylindrical surface portion 136 which extends circumferentially in line with the corresponding surface portion 132, as can be seen in FIG. 5. The surface portions 136, 132 extend around the surface 126a and define with it an annular space around the axis Y for the formation of an oil film. The surface portions 132, 136 therefore have a diameter slightly greater than D3.

At each of its circumferential ends, each collar 116 comprises an attachment tab or flange 138 which is intended to be applied against the attachment tab or flange 134 of the wall 114 and which comprises orifices through which the aforementioned screws or bolts can pass.

The orientation of the flanges 134, 138 can be different at the two circumferential ends of the collars 116. The orientation of the flanges 134, 138 may also differ between the planet gears 108. These parameters can be adapted according to the load applied to the planet gears 108 and the collars 116 during operation.

In the example shown, the flanges 138 of each collar 116 preferably extend in the same plane.

F1 is the direction of the load applied to each of the planet gears 108 during operation (see FIG. 4). The flanges 138 can be offset by between 5° and 175° from this direction, around the axis Y, as shown in FIG. 4. In the example shown, the flanges 138 are located at approximately −90° and +90° respectively to F1.

The number of attachment screws in a set of flanges 134, 138 is, for example, between 1 and 12.

It is therefore understood that the planet gears 108 are guided in rotation about the axes Y by plain bearings formed by the attachment collars 116 mounted around the planet gears 108.

The assembly 100 also comprises a circuit for supplying oil to these plain bearings to form oil films.

In the example shown in FIG. 5, the surface portion 136 of each collar 116 comprises at least one groove 140 for circulating and distributing oil. It is generally T-shaped and comprises two branches 140a, 140b, namely a first branch 140a which extends in the circumferential direction over the surface portion 136 and around the axis Y, and a second transverse branch 140b which extends in the axial direction at one of the ends of the first branch 140a and along the axis Y.

In the example shown, the end of the first branch 140a opposite the second branch 140b is in fluidic communication with a groove 142 in the surface portion 132, which may itself be in fluidic communication with an orifice 143 in the wall 114 for connection to the aforementioned circuit. This orifice 143 is connected, for example, to the dispenser 13 in FIG. 2.

Each collar 116 may have one groove 140 of the aforementioned type, or two grooves 140 of this type. The two grooves 140 can then extend circumferentially around the axis Y, one after the other. One of these grooves 140 can be supplied with oil via a groove 142 in the wall 114, and the other of these grooves could be supplied with oil via another diametrically opposed groove 142 in the wall 114.

Alternatively, oil could be supplied to the groove 140 or the grooves 140 of each collar 116 from the outside of the collar or at the level of the flanges 134, 138.

Figure 6:
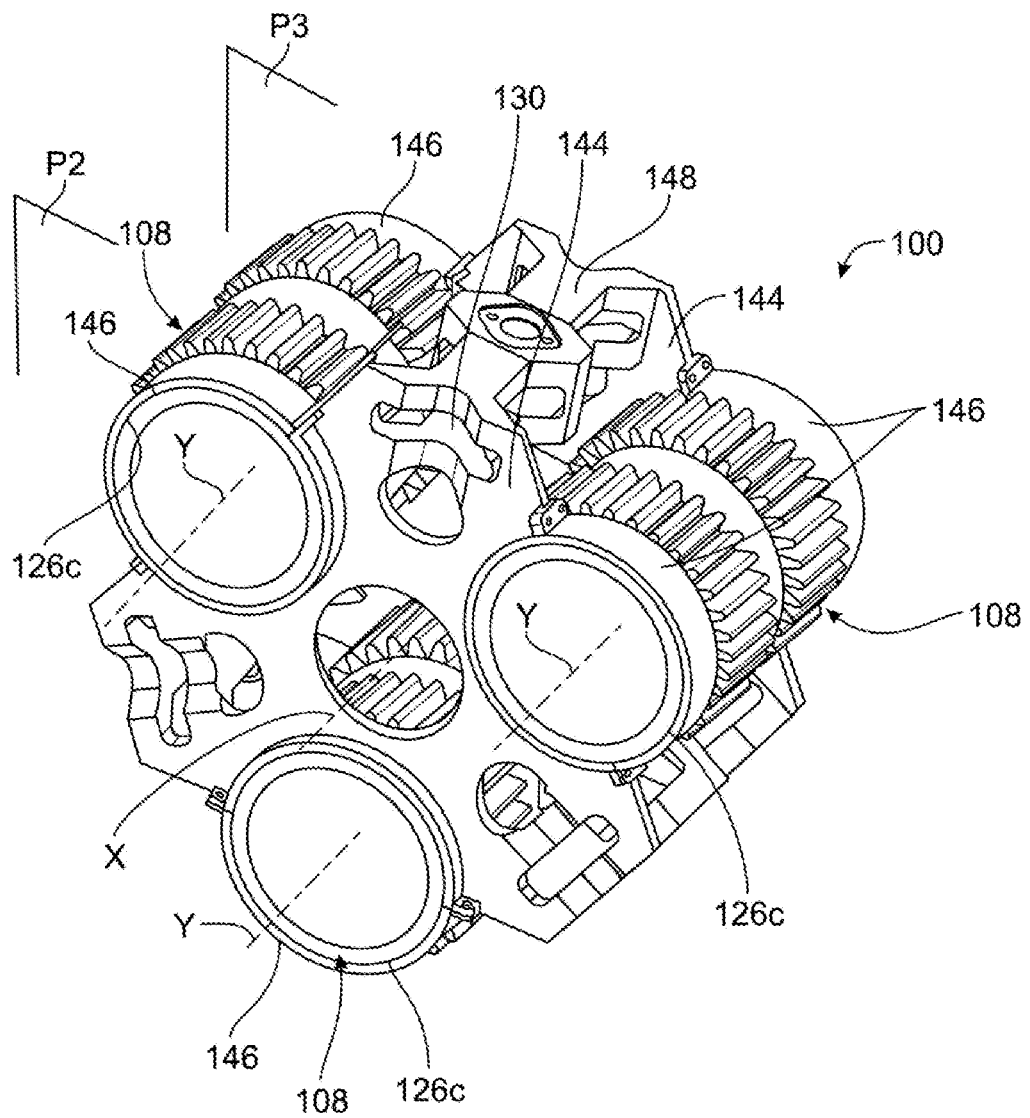
FIG. 6 is a partial schematic perspective view of an assembly according to a second embodiment of the disclosure.
Figure 7:
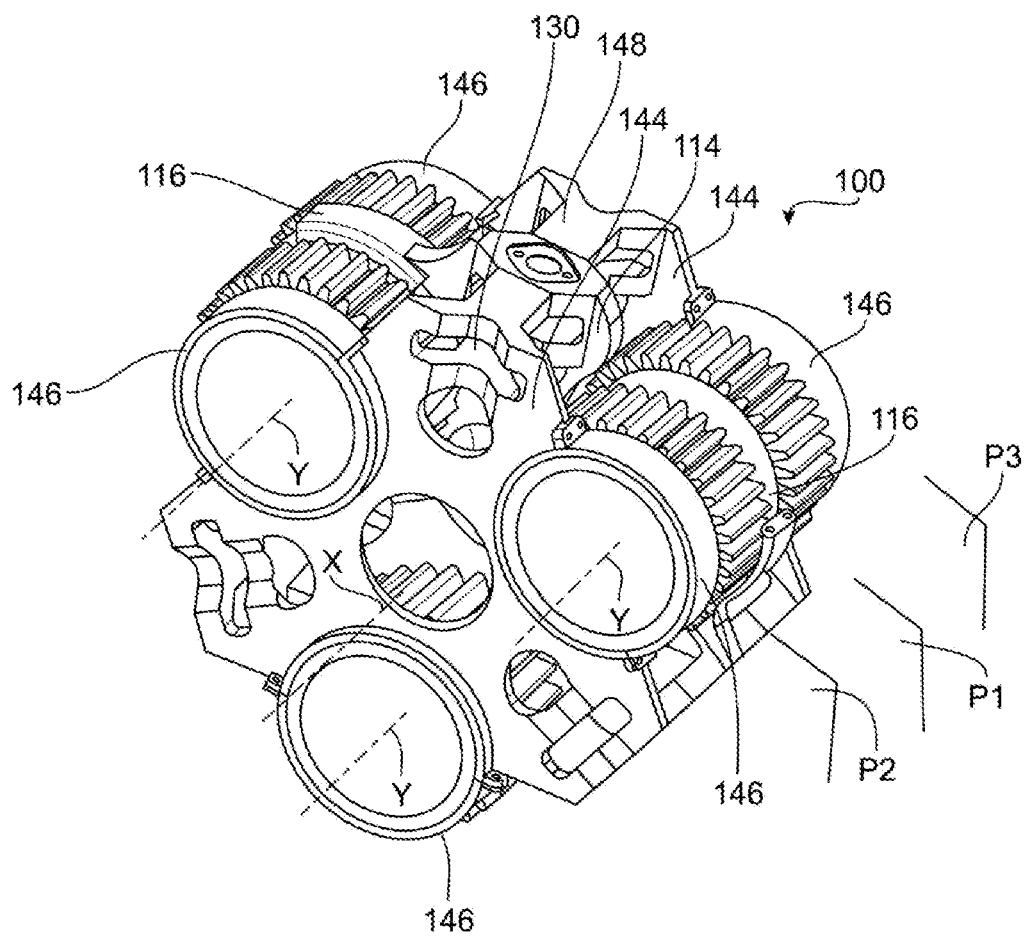
FIG. 7 is a partial schematic perspective view of an assembly according to a third embodiment of the disclosure.

The variant embodiments shown in FIGS. 6 and 7 differ from the previous embodiment in the number of transverse walls and attachment collars of the planet carrier.

In the variant shown in FIG. 6, the planet carrier 110 comprises two transverse walls 144 which are lateral walls extending respectively in two lateral planes P2, P3 perpendicular to the axes X, Y and passing through the longitudinal ends of the planet gears 108.

Each planet gear 108 is attached to the walls 144 by two collars 146 located respectively in the lateral planes P2 and P3. The number of collars 146 is therefore twice the number of planet gears 108. In the example shown, there are three planet gears 108 and therefore six collars 146.

Each wall 144 has a generally triangular shape with truncated summits connected to the truncated summits of the other wall by bridges 148 which are generally parallel to the axes X, Y.

The truncated summits and the bridges 148 comprise the aforementioned housings 130.

The attachment collars 146 are fitted and attached to the sides of the walls 144. As illustrated in the drawings, each of these sides comprises a semi-circular housing which comprises an internal cylindrical surface portion 132, as referred to above.

At each of the circumferential ends of this surface portion 132, the corresponding wall 144 comprises an attachment tab or flange 134 which comprises orifices through which screws or bolts can pass.

The attachment collars 146 are similar to the collars 116 described above.

The collars 146 are respectively passed through by the planes P2, P3 and extend around the surfaces 126b, 126c of the planet gears 108, to form oil films as mentioned above.

At each of the circumferential ends, each collar 146 comprises an attachment tab or flange 138 which is intended to be applied against the attachment tab or flange 134 of the wall 114 and which comprises orifices through which the aforementioned screws or bolts can pass.

It is therefore understood that the planet gears 108 are guided in rotation about the axes Y by plain bearings formed by the attachment collars 146 mounted around the planet gears 108.

The assembly 100 also comprises an oil supply circuit for these plain bearings, of the type described above.

In the variant shown in FIG. 7, the planet carrier 110 comprises three transverse walls 114, 144 which are a median wall 114 and two lateral walls 144. The wall 114 is located between the walls 144. These walls 114, 144 extend respectively in the three aforementioned planes P1, P2, P3.

Each planet gear 108 is attached to the walls 144 by three collars 116, 146 which are located respectively in the planes P1, P2, P3. The number of collars 116, 146 is therefore equal to three times the number of planet gears 108. In the example shown, there are three planet gears 108 and therefore nine collars 146.

The wall 114 is generally triangular in shape with truncated summits connected to the truncated summits of the other walls 144 by bridges 148 which are generally parallel to the axes X and Y.

The truncated summits and the bridges 148 comprise the aforementioned housings 130.

The collars 116, 146 are fitted and attached to the sides of the walls 144. As illustrated in the drawings, each of these sides comprises a semi-circular housing which comprises an internal cylindrical surface portion 132, as referred to above.

At each of the circumferential ends of this surface portion 132, the corresponding wall comprises an attachment tab or flange 134 which comprises orifices through which screws or bolts can pass.

The attachment collars 116, 146 are similar to the collars 116, 146 described above.

The collars 116, 146 are respectively passed through by the planes P1, P2, P3 and extend around the surfaces 126a, 126b, 126c of the planet gears 108, to form oil films as mentioned above.

At each of the circumferential ends, each collar 116, 146 comprises an attachment tab or flange 138 which is intended to be applied against the attachment tab or flange 134 of the wall 114, 144 and which comprises orifices for the aforementioned screws or bolts to pass through.

It is therefore understood that the planet gears 108 are guided in rotation about the axes Y by plain bearings formed by the attachment collars 116, 146 mounted around the planet gears 108.

The assembly 100 also comprises an oil supply circuit for these plain bearings, of the type described above.

The disclosure allows to compact the assembly 100 and therefore the reducer 6 designed to receive this assembly. The bearings in this assembly can support higher loads at a larger diameter. By placing the bearings outside the planet gears 108, it is possible to:
- reduce the diameter of the toothing 118 of the planet gear 108, and therefore the radial overall dimensions of the reducer 6, and/or
- reduce the length of the bearing and therefore the length of the reducer.

The embodiments of the invention in which an exclusive property or privilege is claimed are defined as follows:

1. A drive assembly for a mechanical reducer for a turbomachine, the drive assembly comprising:
    planet gears distributed around a first axis, each of the planet gears having a corresponding second axis of rotation parallel to the first axis, each of the planet gears comprising at least one external meshing toothing,
    a planet carrier comprising at least one transverse wall perpendicular to the first axis,
    plain bearings configured to guide each of the planet gears in rotation about the corresponding second axis, the plain bearings being carried by the planet carrier, and
    an oil supply circuit for the plain bearings,
    wherein:
        the planet carrier comprises collars configured to attach the planet gears to said at least one transverse wall, each of the collars extending around a planet gear and the corresponding second axis and comprising at least one internal cylindrical surface portion,
        each of the planet gears comprises at least one external cylindrical surface for forming an oil film with said at least one internal cylindrical surface portion,
        said oil supply circuit opens onto said at least one internal cylindrical surface portion of each of the collars for the formation of said oil film, and
        each of the planet gears is attached by a median attachment collar, which is located in a median plane perpendicular to the first axis and passing through the middles of the planet gears.

2. The drive assembly according to claim 1, wherein the internal cylindrical surface portion of each of the collars extends around the second axis in the extension of an internal cylindrical surface portion of said at least one transverse wall.

3. The drive assembly according to claim 1, wherein each of the planet gears is attached by one or three attachment collars.

4. The drive assembly according to claim 1, wherein each of the planet gears is additionally attached by two lateral attachment collars, which are located in two planes perpendicular to the first axis and passing through longitudinal ends of the planet gears.

5. The drive assembly according to claim 4, wherein the planet carrier further comprises two lateral transverse walls, which are located respectively in said two lateral planes perpendicular to the first axis and to which the two attachment collars are attached respectively.

6. The drive assembly according to claim 4, wherein each of the planet gears comprises two external cylindrical oil film-forming surfaces at its two longitudinal ends respectively.

7. The drive assembly according to claim 1, wherein the planet carrier comprises a median transverse wall which is situated in said first plane and which carries said median attachment collar.

8. The drive assembly according to claim 1, wherein each of the planet gears further comprises two external meshing toothings separated from each other by an external cylindrical oil film-forming surface.

9. The drive assembly according to claim 8, wherein said external cylindrical surface is located at a bottom of an annular groove that extends around the second axis and which separates the two toothings, this external cylindrical surface being surrounded by a collar which is at least partly housed in this groove.

10. The drive assembly according to claim 1, wherein the clamping collars each have an angular extent about one of the second axes greater than or equal to 180°.

11. The drive assembly according to claim 1, wherein the planet carrier further comprises a cage and a cage carrier connected to the cage by flexible connections, the attachment collars and said at least one transverse wall forming part of the cage.

12. The drive assembly according to claim 1, wherein said at least one internal cylindrical surface portion of each of the attachment collars comprises at least one oil circulation groove.

13. The drive assembly according to claim 12, wherein the at least one oil circulation groove has a generally T-shaped form and comprises a first branch which extends in the circumferential direction over said at least one internal cylindrical surface portion and around the second axis, and a second transverse branch which extends in the axial direction at an end of the first branch and along the axis.

14. The drive assembly according to claim 13, wherein the end of the first branch opposite the second branch is in fluidic communication with a groove of said at least one transverse wall and/or is in fluidic communication with an orifice of said at least one transverse wall.

15. A mechanical reducer for a turbomachine, comprising the drive assembly according to claim 1, the reducer comprising a sun gear centered on the first axis and meshed with the planet gears, and a ring gear centered on the first axis and meshed with the planet gears.

16. A turbomachine, comprising at least one drive assembly according to claim 1.

17. A turbomachine, comprising at least one mechanical reducer according to claim 15.

* * * * *